United States Patent
Takami (10) Patent No.: US 6,285,099 B1
(45) Date of Patent: Sep. 4, 2001

(54) IMAGE FORMING APPARATUS (75) Inventor: Nobuo Takami, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/502,001

(22) Filed: Feb. 11, 2000

(30) Foreign Application Priority Data

Feb. 12, 1999 (JP) ................................................. 11-035091

(51) Int. Cl.$^7$ ............................ G03G 15/01; H02K 5/00; H02K 5/24
(52) U.S. Cl. ............................... 310/51; 310/91; 248/638; 399/1
(58) Field of Search ............................ 310/51, 89, 75 R, 310/91; 399/1, 107, 411; 248/637, 638

(56) References Cited

U.S. PATENT DOCUMENTS

| | | | |
|---|---|---|---|
| 3,337,165 | * 8/1967 | Kondo | 248/638 |
| 4,161,812 | * 7/1979 | Litch | 29/446 |
| 5,149,049 | * 9/1992 | Nemura et al. | 248/674 |
| 5,323,211 | * 6/1994 | Fujii et al. | 355/200 |
| 5,435,517 | * 7/1995 | McGuire | 248/637 |
| 5,884,893 | * 3/1999 | Seki et al. | 248/638 |
| 5,926,670 | 7/1999 | Furuta et al. | 399/101 |
| 5,970,278 | 10/1999 | Munakata | 399/46 |
| 5,983,060 | 11/1999 | Namekata et al. | 399/297 |
| 6,006,062 | 12/1999 | Takahashi et al. | 399/310 |

FOREIGN PATENT DOCUMENTS

| | | |
|---|---|---|
| 7-099593 | 4/1995 | (JP). |
| 9-120209 | 5/1997 | (JP). |
| 9-230658 | 9/1997 | (JP). |
| 10-338380 | 12/1998 | (JP). |

* cited by examiner

Primary Examiner—Burton S. Mullins
(74) Attorney, Agent, or Firm—Oblon, Spivak, McClelland, Maier & Neustadt, P.C.

(57) ABSTRACT

In an image forming apparatus, revolver or rotary developing unit and a revolver motor include a revolver gear and a motor gear, respectively. While a reaction acts from the revolver gear on the motor gear, a bracket bears the side surface or surfaces of the revolver motor in order to prevent the teeth of the motor bear and those of the revolver gear from skipping each other. The reaction acting on a motor mount is scattered in order to protect the characteristic of the motor mount from deterioration.

8 Claims, 8 Drawing Sheets

IMAGE FORMING APPARATUS

BACKGROUND OF THE INVENTION

The present invention relates to a copier, printer, facsimile apparatus or similar electrophotographic image forming apparatus and more particularly to an image forming apparatus including a revolver or rotary developing device rotatable relative to an apparatus body and a drive source for controlling the drive and stop of the revolver.

A color image forming apparatus including a revolver rotatable relative to its body is conventional. To increase the operation speed and durability of such an apparatus, some different conditions must be satisfied, as follows. First, a period of time necessary for the revolver to switch the color for development must be reduced in order to drive the revolver at high speed. Second, the rigidity of the revolver must be great enough to withstand sudden starts and stops of rotation and to insure an accurate gap for development. Third, a developing roller must be provided with a larger diameter in order to increase the developing speed. Fourth, the amount of developer to be stored in the revolver must be increased to extend the life or maintenance period of the revolver. However, a revolver satisfying all of the above conditions is bulky and heavy and has therefore a great moment of inertia. It follows that a drive motor with greater power is required to drive the revolver at high speed.

The problem with the image forming apparatus of the type described is that when the vibration of the drive motor is transferred to the apparatus body, it effects image writing accuracy and thereby brings about so-called jitter in images. In addition, the apparatus body outputs annoying high frequency noise. In light of this, it is a common practice with the apparatus to interpose a motor mount or vibration absorbing member formed of rubber between the apparatus body and the mounting surface of the drive motor.

However, when the above motor mount is applied to a drive unit assigned to a revolver operable at high speed, the revolver overruns at the time of a stop and shifts a developing position, resulting in the color omission of an image. It was experimentally found that the overrun was ascribable to the shaking of the drive motor varying the distance between the axis of a revolver gear and that of a motor gear. The variation in the above distance caused the teeth of the two gears to skip each other when the revolver was decelerated.

Assume that the revolver with a great moment of inertia and rotating at the top speed is caused to stop by sharp acceleration. Then, a heavy load acts on the tooth surfaces of the motor gear. As a result, the motor mount elastically bears the displacement of the motor tending to move, or shake, away from the revolver gear. During repeated image formation, the motor mount formed of rubber generates heat due to the absorption of the motor vibration and the resistance to the load of the shaking of the motor. This, coupled with heat transferred from the motor, raises the temperature of rubber constituting the motor mount. The Young's modulus of rubber decreases with an increase in temperature and aggravates the above shaking of the motor shaft for a given load acting on the motor gear.

When the revolver is heavy weight, considerable speed reduction must be implemented by gears for a given rotation speed of the motor. It follows that to accurately stop the rotation of the revolver, the number of gears constituting a driveline should preferably as small as possible in order to minimize the influence of the backlash of gears. For a great speed reduction ratio, a driven gear must be provided with a great number of teeth relative to the number of teeth of a drive gear, so that the module of the gear is limited.

For the above reason, the gear teeth have a relatively small height and limits a margin as to the variation of the distance between the axis ascribable to the shake of the motor shaft. As the temperature of the rubber constituting the motor mount rises, the shake of the motor shaft ascribable to the load acting during deceleration increases and results in overrun for the long run. This is likely to occur particularly when the motor shaft is made long for layout reasons, when the rubber of the motor mount is made thick in order to sufficiently intercept vibration, or when the distance between the motor mounting surface and the gear is great.

The rigidity of the motor mount may be increased if the motor mount is provided with rubber having greater hardness or smaller thickness. However, the upper limit of rubber hardness is limited by fluidity during molding. Moreover, increasing the rigidity of the motor mount causes the motor mount to lose its vibration absorbing function.

The above problems occur with various kinds of rotary units including the revolver.

Technologies relating to the present invention are disclosed in, e.g., Japanese Patent Laid-Open Publication Nos. 7-99593, 9-120209, 9-230658, and 10-338380.

SUMMARY OF THE INVENTION

It is therefore an object of the present invention to provide an image forming apparatus including a revolver and capable of obviating vibration and noise ascribable to the rotation of a motor while preventing the stop position of the revolver from being deviated due to overrun.

An image forming apparatus of the present invention includes an apparatus body, a rotary unit rotatable relative to the apparatus body, and a drive unit for causing the rotary unit to rotate and then stop at a preselected position. The drive unit includes a motor member, a vibration absorbing member intervening between the mounting surface of a motor case substantially perpendicular to the shaft of the motor member and apparatus body, and a motor position regulating member contacting or adjoining the surface of the motor case substantially in parallel to the shaft of motor member.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
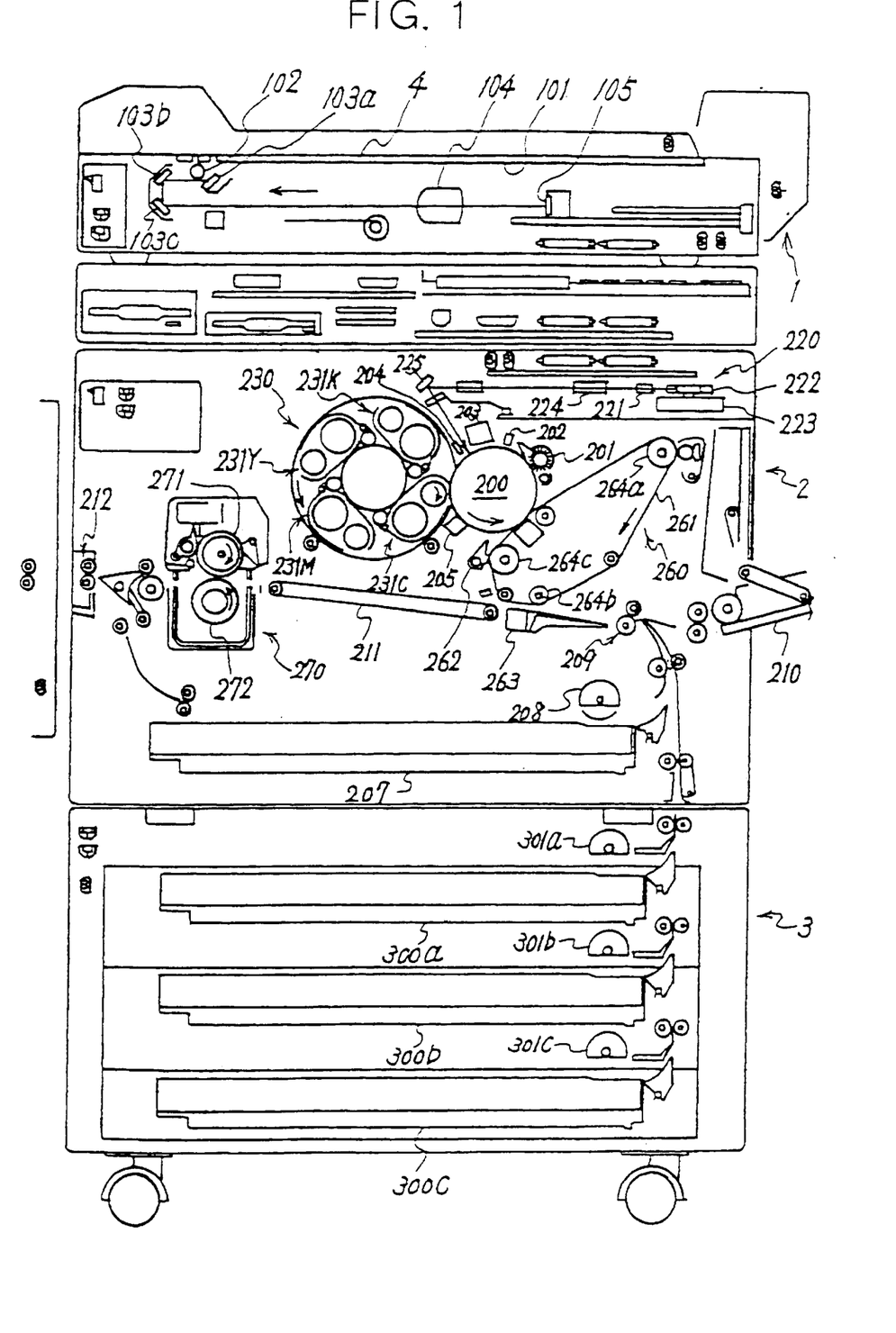
FIG. 1 is a front view showing an image forming apparatus embodying the present invention.

Referring to FIG. 1 of the drawings, an image forming apparatus embodying the present invention is shown and implemented as an electrophotographic color copier by way of example. As shown, the color copier includes a color scanner or document reading device 1, a color printer or color image recording device 2, and a paper bank 3.

The color scanner 1 includes a lamp 102 for illuminating a document 4 laid on a glass platen 101. The resulting imagewise reflection from the document 4 is routed through a group of mirrors 103a, 103b and 103c and a lens 104 to a color sensor 105. The color sensor 105 reads color image information representative of the document 4 color by color to thereby output, e.g., R (red), G (green) and B (blue) electric color signals. In the illustrative embodiment, the color sensor 105 reads R, G and B color images derived from the image of the document 4 at the same time. An image processing section, not shown, converts the R, G and B color signals to Bk (black), C (cyan), M (magenta) and Y (yellow) color image data on the basis of the intensity levels of the R, G and B signals.

More specifically, to produce the Bk, C, M and Y color image data, optics including the lamp 102 and mirrors 103a–103c scans the document 4 in a direction indicated by an arrow in FIG. 1 in response to a scanner start signal synchronous to the operation of the color printer 2 which will be described later. The optics repeatedly scans the same document 4 four consecutive times in order to sequentially output color image data of four different colors. Every time the color printer 2 receives the color image data of one color, it produces a corresponding toner image. Finally, four toner images are superposed to complete a four-color or full-color image.

The color printer 2 includes a photoconductive drum or image carrier 200, an optical writing unit 220, a revolver or rotary developing device 230, an intermediate image transferring device 260, and a fixing device 270. The drum 200 is rotatable counterclockwise, as indicated by an arrow in FIG. 1. Arranged around the drum 200 are a drum cleaning device 201, a discharge lamp 202, a charger 203, a potential sensor 204, one of four developing sections included in the revolver 230, a density pattern sensor 205, and an intermediate transfer belt 261 included in the intermediate image transferring device 260. The revolver 230 has four developing sections, i.e., a Bk developing section 231K, an M developing section 231M, a C developing section 231C, and a Y developing section 231Y. In FIG. 1, the C developing section 231C is shown as facing the drum 200.

The optical writing unit 220 converts the color image data received from the scanner 1 to an optical signal and writes an image represented by the image data on the drum 200 with the optical signal, thereby electrostatically forming a latent image on the drum 200. For this purpose, the writing unit 220 includes a semiconductor laser 221, a laser drive controller, not shown, a polygonal mirror 222, a motor 223 for driving the mirror 222, an f/θ lens 224, and a mirror 225.

The revolver including the four developing sections 231K, 231C, 231M and 231Y is bodily rotated by a driveline that will be described later. The developing sections 231K–231Y each include a developing sleeve rotatable with a developer deposited thereon contacting the surface of the drum 200, and a paddle for scooping up and agitating the developer. The developer stored in each developing section is a mixture of toner of particular color and ferrite carrier. While the developer is agitated, the toner is charged to negative polarity due to friction acting between it and the carrier. A particular bias power source, not shown, is assigned to each developing sleeve and applies a bias for development to the sleeve, so that the sleeve is biased to a preselected potential relative to the metallic base of the drum 200. The bias is a negative DC voltage Vdc on which an AC voltage Vac is superposed.

While the copier is in a stand-by state, the revolver 230 is held stationary with its Bk developing section 231K facing the drum 200 at a preselected developing position. On the start of a copying operation, the color scanner 1 starts reading the document 4 at a preselected timing. Optical writing using a laser beam and the formation of a latent image begin on the basis of the resulting color image data. Let a latent image derived from Bk image data be referred to as a Bk latent image. This is also true with C, M and Y. To develop the Bk latent image from its leading edge, the Bk sleeve starts rotating before the leading edge of the Bk latent image arrives at the developing position. The Bk sleeve develops the Bk latent image with Bk toner. As soon as the trailing edge of the Bk latent image moves away from the developing position, the revolver 230 bodily rotates to bring the next developing section to the developing position. This rotation is completed at least before the leading edge of the next latent image arrives at the developing position. The construction and operation of the revolver 230 will be described more specifically later.

The intermediate image transferring device 260 includes the intermediate transfer belt 261, a belt cleaning device 262, and a corona discharger for paper transfer 263. The belt 261 is passed over a drive roller 264a, a transfer counter roller 264b, a cleaning counter roller 264c and driven rollers (no numeral) and driven by a motor not shown. The belt cleaning device 262 includes an inlet seal, a rubber blade, an outlet coil, and a mechanism for moving the inlet seal and rubber blade into and out of contact with the belt 261. While the transfer of images of the second, third and fourth colors to the belt 261 is under way after the transfer of the Bk or first-color image, the above mechanism maintains the inlet seal and blade released from the belt 261. The corona discharger 263 is applied with an AC-biased DC voltage or a DC voltage in order to transfer the entire full-color image from the belt 261 to a paper or similar recording medium.

The color printer 2 includes a paper cassette 207 while the paper bank 3 includes paper cassettes 300a, 300b and 300c. The paper cassettes 207 and 300a–300c each are loaded with a stack of papers of particular size. Pickup rollers 208 and 301a–301c are respectively assigned to the paper cassettes 207 and 300a–300c. Papers are fed from desired one of the cassettes 207 and 300a–300c by associated one of the pickup rollers 208 and 301a–301c toward a registration roller pair 209. A manual feed tray 210 is mounted on the right side of the printer 2, as viewed in FIG. 1, for allowing the operator to feed OHP (OverHead Projector) sheets, thick sheets or similar special sheets by hand.

In operation, at the beginning of an image forming cycle, the drum 200 and belt 261 are caused to rotate counterclockwise and clockwise, respectively. Bk, C, M and Y toner image are sequentially formed on the drum 200 and sequentially transferred form the drum 200 to the belt 261 one above the other, completing a full-color image on the belt 261.

Specifically, to form the Bk toner image, the charger 203 uniformly charges the drum 200 to about −700 V. The semiconductor laser 221 scans the charged drum 200 in accordance with the Bk color image signal by raster scanning. In the portions of the drum 200 exposed by the laser 221, the charge is reduced by an amount proportional to the quantity of light with the result that the Bk latent image is formed. Negatively charged Bk toner deposited on the Bk developing sleeve contacts the Bk latent image and deposits only on the exposed portions of the drum 200 where the charge has been reduced. Consequently, a Bk toner image corresponding to the latent image is formed on the drum 200. The corona discharger 263 transfers the Bk toner image from the drum 200 to the belt 261 moving at the same speed as the drum 200 in contact with the drum 200. The transfer of a toner image from the drum 200 to the belt 261 will be referred to as belt transfer hereinafter.

After the belt transfer, the drum cleaning device 201 removes the toner left on the drum 200 in a small amount, thereby preparing the drum 200 for the next image forming cycle. The toner removed by the device 201 is collected in a waste toner tank via a piping although not shown specifically.

A C image forming step begins with the drum 200 after the above Bk image forming step. Specifically, the color scanner 1 starts reading C image data at a preselected timing. Laser writing using the resulting C image data forms a C latent image on the drum 200. After the trailing edge of the Bk latent image has moved away from the developing position, but before the leading edge of the C latent image arrives at the developing position, the revolver 230 is caused to rotate to bring the C developing unit 231C to the developing position. The C developing section 231C then develops the C latent image with C toner. As soon as the trailing edge of the C latent image moves away from the developing position, the revolver 230 is again rotated to bring the M developing section 231 to the developing position. This is also completed before the leading edge of the M latent image arrives at the developing position.

M and Y developing steps are similar to the Bk and C steps as to color image data reading, latent image formation and development and will not be described specifically in order to avoid redundancy.

The Bk, C, M and Y toner images are sequentially transferred from the drum 200 to the belt 261 one above the other so as to a full-color image on the belt 261. Subsequently, the corona discharger 263 transfers the entire full-color image from the belt 261 to a paper.

The paper is fed from any one of the previously stated paper cassettes or the manual feed tray and stopped by the registration roller 209. Thereafter, the registration roller 209 conveys the paper such that the leading edge of the paper meets the leading edge of the toner image carried on the belt 261 and reaching the corona discharger 263. The paper moves above the corona discharger 263 while being superposed on the toner image of the belt 261. At this instant, the corona discharger 263 charges the paper with a positive charge with the result that the full-color image is substantially entirely transferred to the paper. Subsequently, a corona discharger, not shown, located at the left-hand side of the corona discharger 263 and applied with an AG-biased OC voltage discharges the paper. As a result, the paper is separated from the belt 261 and transferred to a conveyor belt 211.

The conveyor belt 211 conveys the paper carrying the full-color image thereon to the fixing device 270 including a heat roller 271 control led to a preselected temperature and a press roller 272. The heat roller 271 and press roller 272 pressed against the heat roller 271 fix the toner image on the paper with heat and pressure. Thereafter, the paper or full-color copy is driven out of the copier body to a copy tray, not shown, face up by an outlet roller pair 212.

After the belt transfer, the brush roller and rubber blade included in the drum cleaning device 201 clean the surface of the drum 200. The discharge lamp 202 uniformly discharges the cleaned surface of the drum 200. Also, the blade included in the belt cleaning device 262 is again pressed against the belt 261 in order to clean the surface of the belt 261 after the image transfer to the paper.

The revolver 230 will be described more specifically with reference to FIGS. 2 and 3. As shown, the revolver 230 includes a hollow stay 282 having a rectangular cross-section and extending between a front and a rear end plate 230a and 230b resembling disks. The developing sections 231K–231Y are supported by the stay 282 and respectively include casings 283K, 283O, 283M and 283Y identical in configuration with each other. The casings 283K–283Y each store a developer of particular color, i.e., a mixture toner of particular color and carrier. The revolver 230 is shown as locating the Bk developing section 231K at the developing position and having the Bk developing section 231K, Y developing section 231Y, M developing section 231M and C developing section 231C sequentially arranged in this order in the counterclockwise direction, as viewed in FIG. 2.

Figure 2:
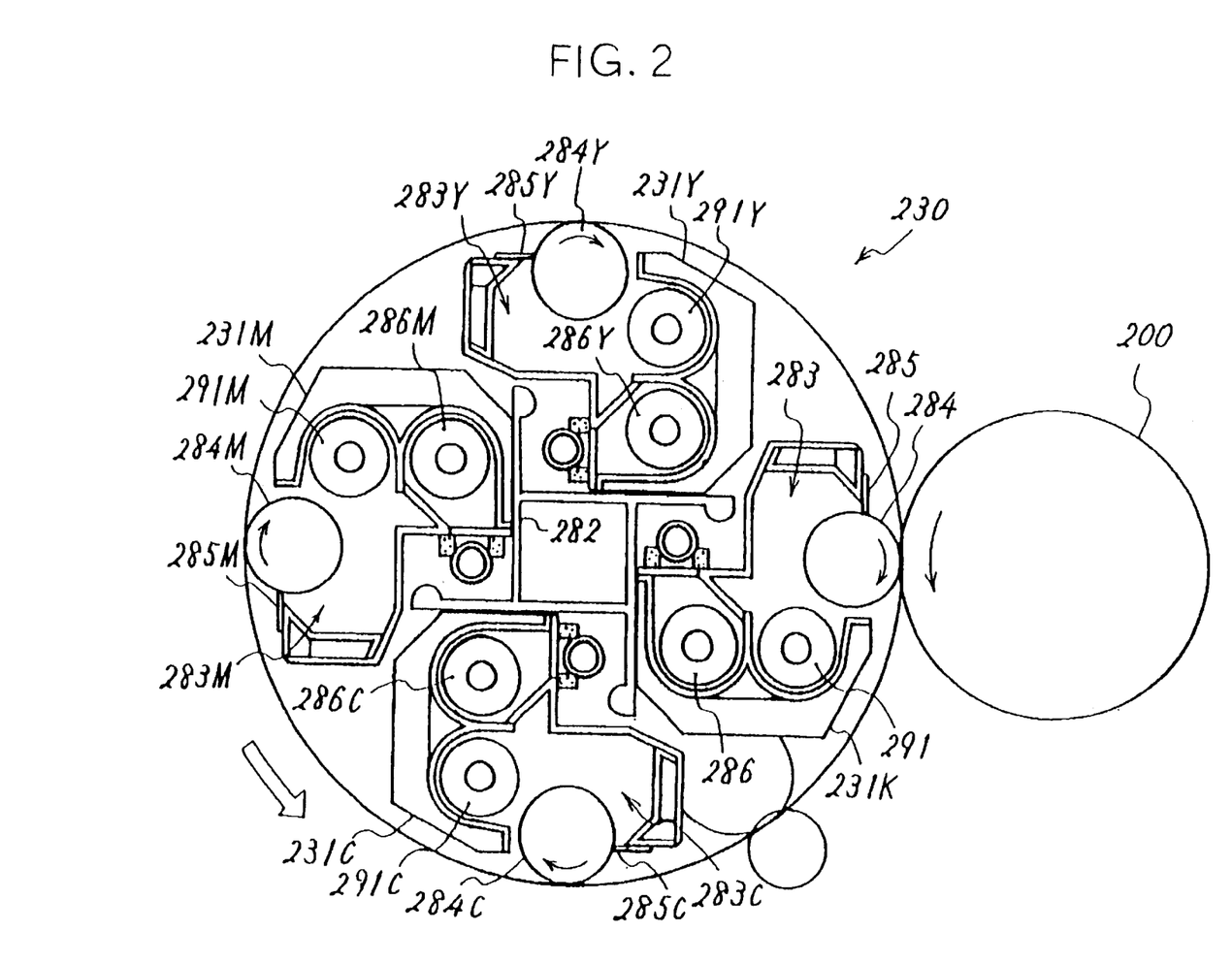
FIG. 2 is a section of a revolver included in the illustrative embodiment.
Figure 3:
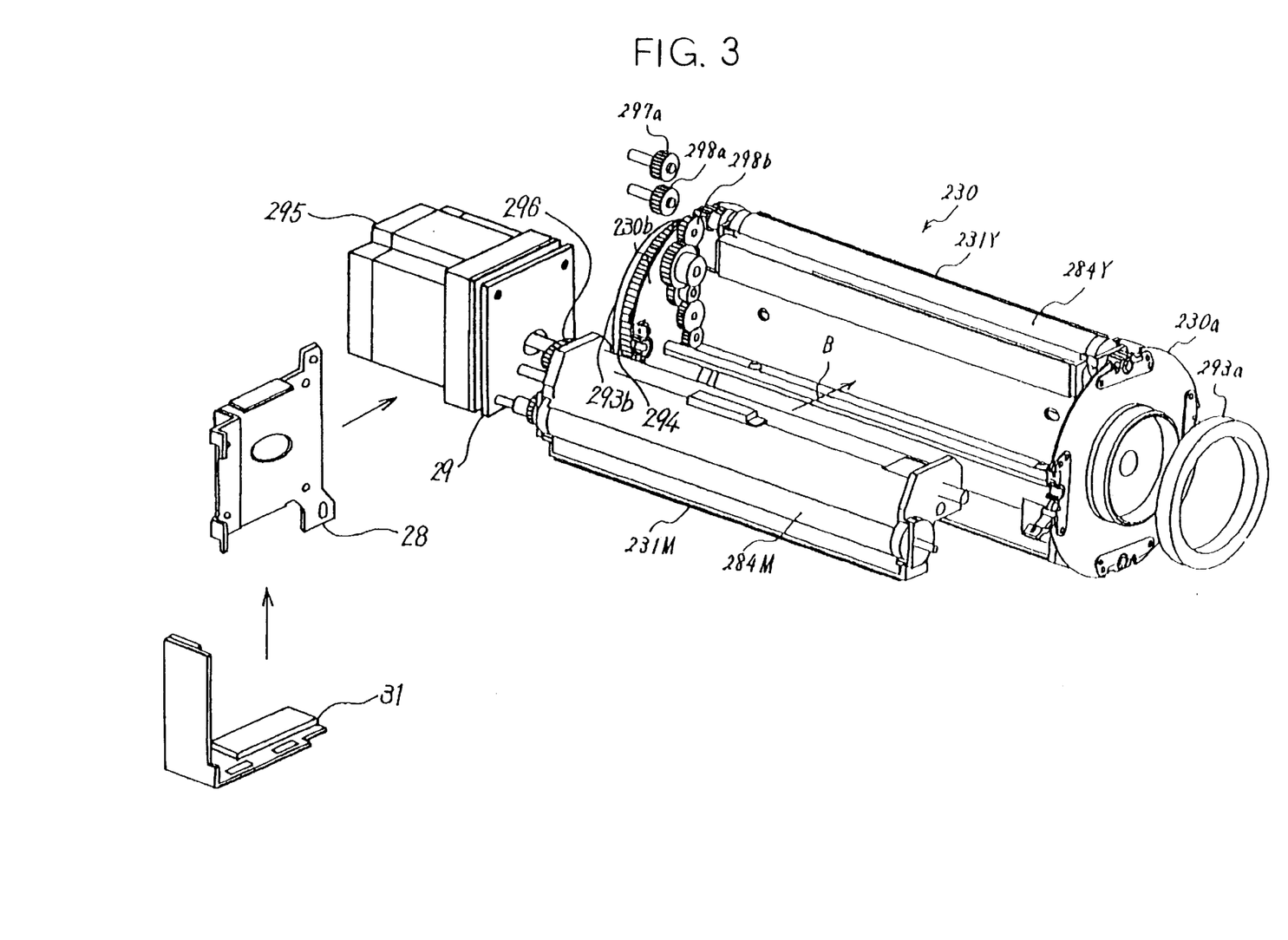
FIG. 3 is an isometric view showing the revolver.

Because the four developing sections 231K–231O are identical in construction, the following description to be made with reference to FIGS. 2 and 3 will concentrate on the Bk developing section 231K by way of example. The other developing sections are simply distinguished from the Bk developing section 231K by suffixes Y, M and C.

In the Bk developing section 231K, the casing 283 is formed with an opening through which a developing roller or developer carrier 284 is partly exposed to the outside and faces the drum 200. The developing roller 284 is made up of a magnet and a sleeve surrounding the magnet. A doctor blade 285 is also disposed in the casing 283 for regulating the amount of the developer to be conveyed by the developing roller 284 toward the drum 200. A first conveyor screw 286 conveys part of the developer scraped off by the doctor blade 285 from the rear to the front in the axial direction. A second conveyor screw 291 is identical with the first conveyor screw 286 except that it conveys the above part of the developer from the front to the rear. A toner content sensor 292 is positioned in the casing 283 below the second screw 291 for sensing the toner content of the developer stored in the casing 283.

Figure 4:
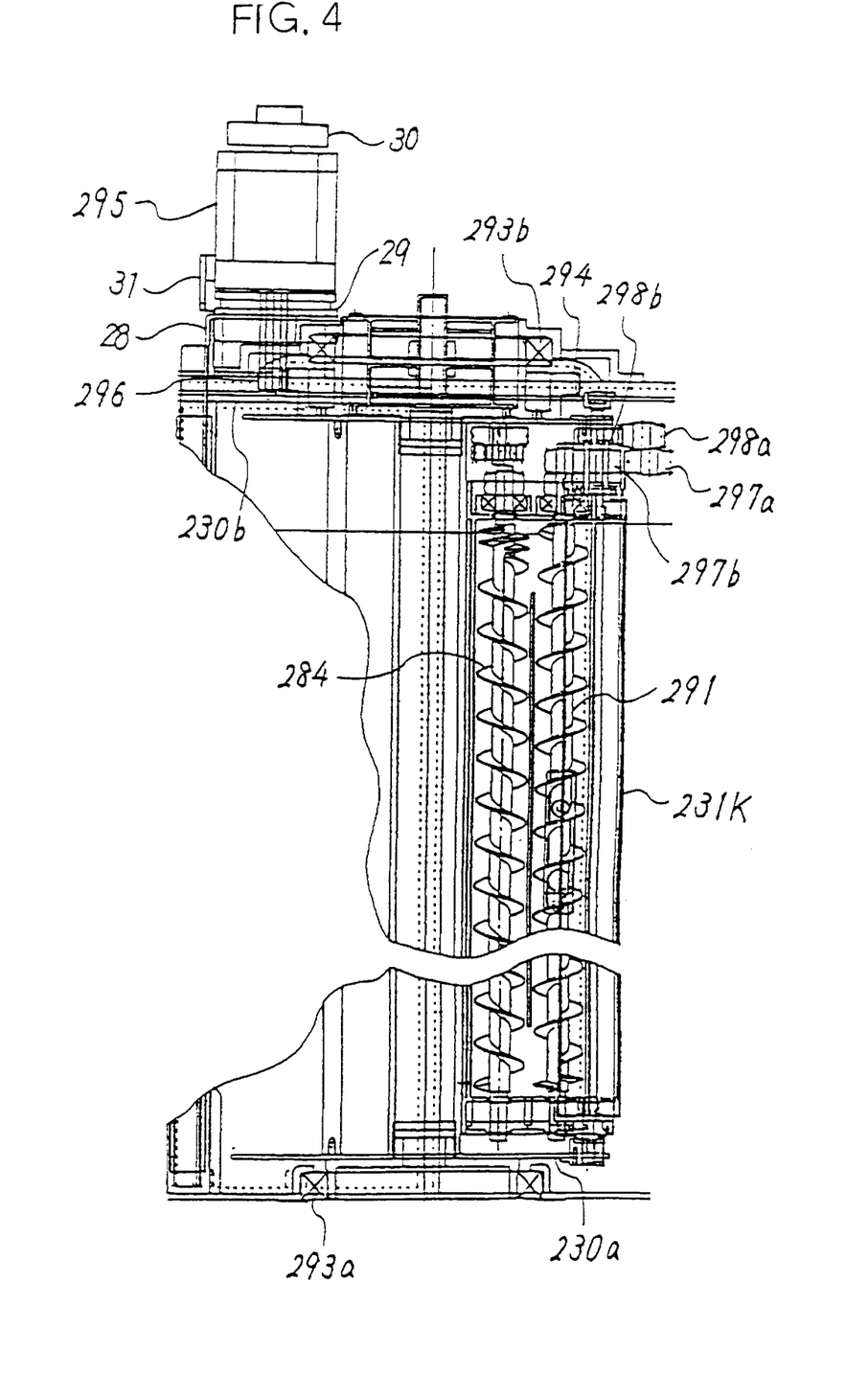
FIG. 4 is a plan view showing a toner conveying section and a driveline included in the revolver.

FIG. 4 is a vertical section in a plane containing the axes of the two conveyor screws 286 and 292 of the Bk developing section 231K. As shown, the conveyor screws 2865 and 291 each are rotated in a particular direction to circulate the developer stored in the casing 283 while agitating it. The developer is deposited on and conveyed by the sleeve of the developing roller 284 being rotated. After the developer has been regulated by the doctor blade 285, it is conveyed toward the developing position by the above sleeve. At the developing position, the toner contained in the developer is transferred to the drum 200.

As shown in FIGS. 3 and 4, revolver support bearings 293a and 293b are respectively mounted on the front and rear end plates 230a and 230b and support the revolver 230. A motor gear 296 is mounted on the output shaft of a revolver motor 295 and held in mesh with a revolver gear 294 mounted on the rear end plate 230b. In this configuration, the motor 295 causes the revolver 230 to rotate via the gears 296 and 294 such that the developing sections 231K–231C each are located at a preselected position. The developing section 231 held at the developing position is capable of developing a latent image and being replenished with fresh toner with idler gears 297b and 298b meshing with drive gears 297a and 298a which are assigned to development and toner replenishment, respectively.

Figure 5:
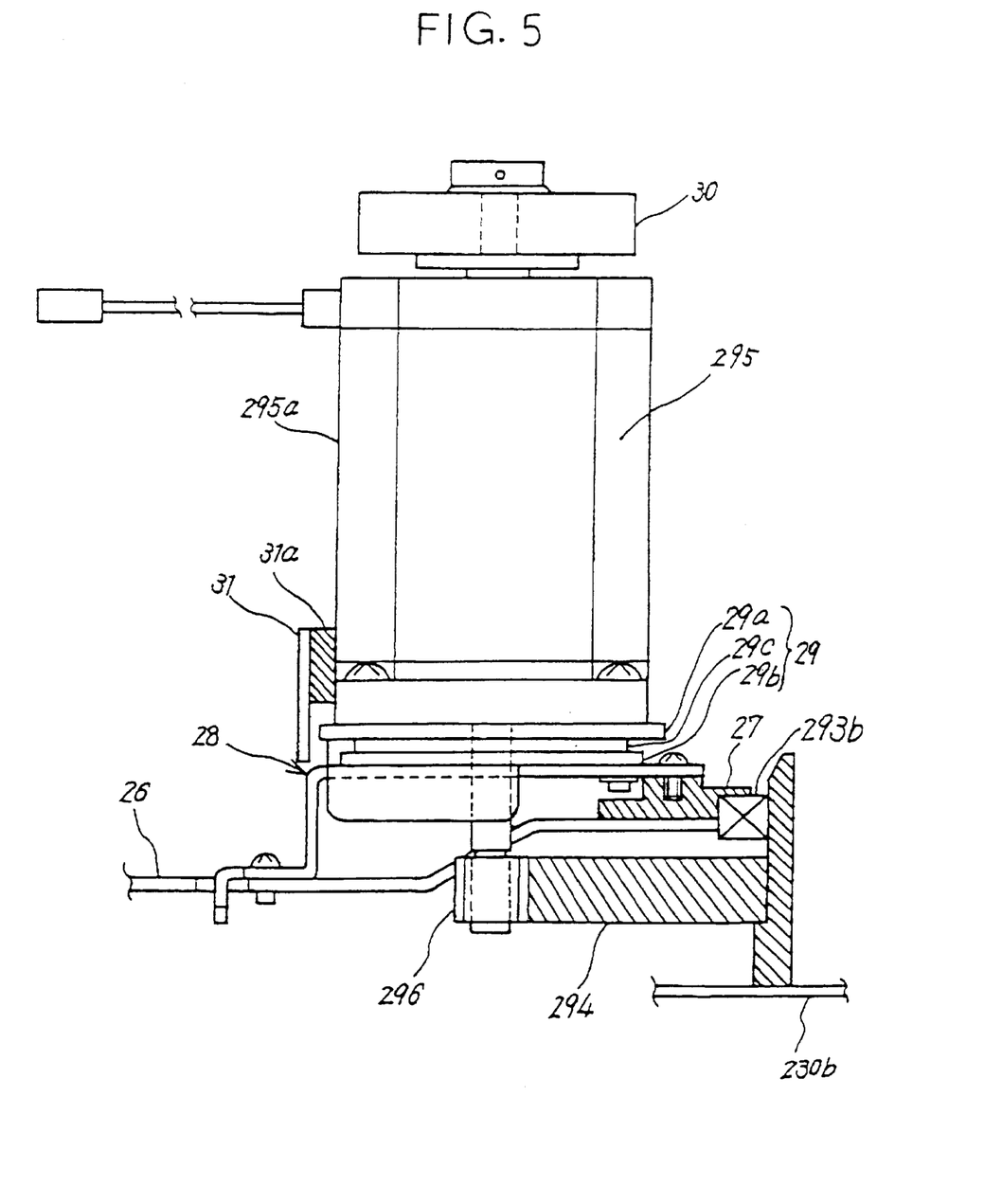
FIG. 5 is a view showing a revolver motor and arrangements therearound.
Figure 6:
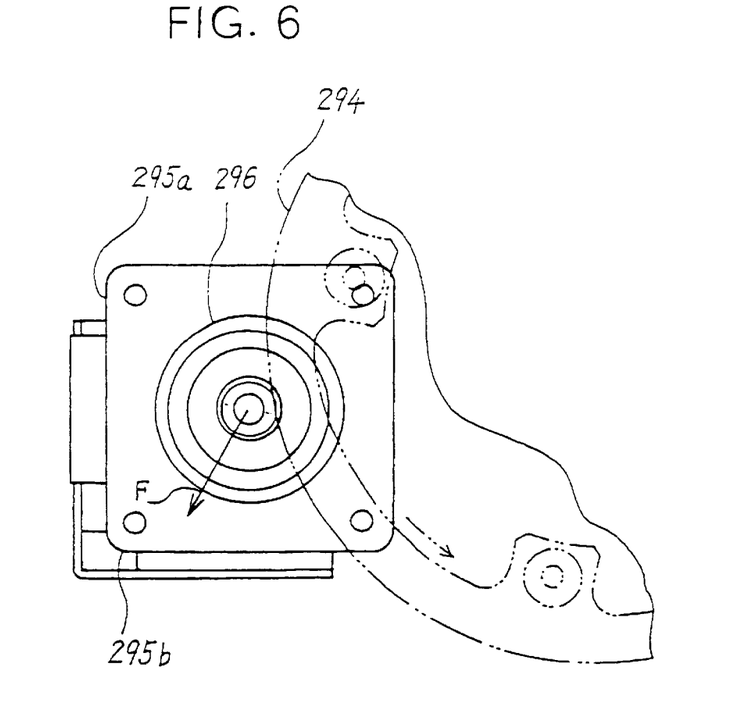
FIG. 6 is a fragmentary front view showing the driveline of revolver.

Hereinafter will be described a characteristic implementation of the illustrative embodiment for preventing the teeth of the motor gear 296 and those of the revolver gear 294, or drive transmission member, from skipping each other. FIG. 5 shows the revolver motor 295 and arrangements around it while FIG. 6 shows a driveline for driving the revolver 230.

Figure 7:
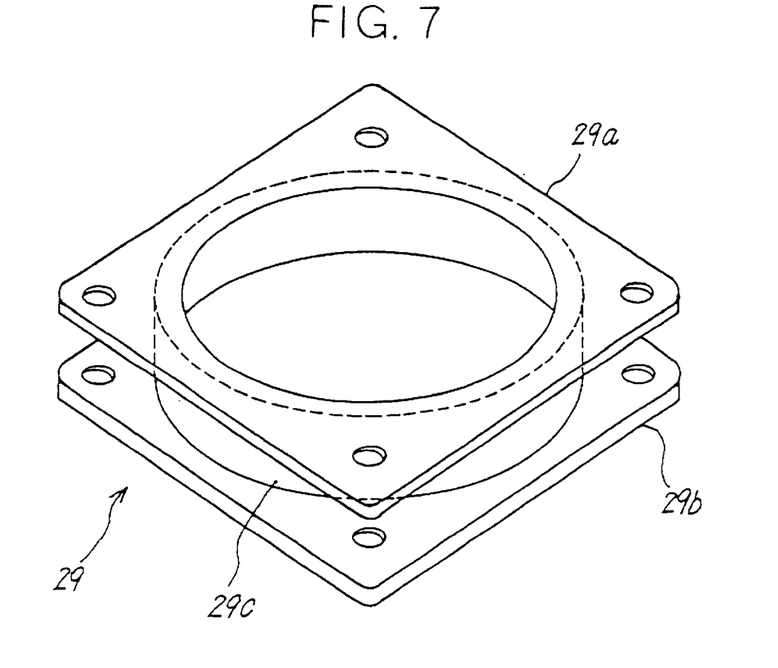
FIG. 7 is an isometric view showing a motor mount included in the illustrative embodiment.

As shown in FIG. 5, a motor bracket 28 is fastened by screws to a side wall 26 included in the copier body and a bearing holder 27 in which a revolver support bearing 293b is press fitted. The revolver motor 295 i 5 mounted on the motor bracket 28 via a motor mount or vibration absorbing member 29. A mechanical damper 30 is mounted on the rear end of the shaft of the revolver motor 295 in order to dampen vibration and enhance high-speed rotation. The motor mount 29 prevents the vibration of the revolver motor 295 from being imparted to the copier body. FIG. 7 shows a specific configuration of the motor mount 29. As shown, the motor mount 29 is implemented as a single molding made up of a pair of sheet steel members 29a and 29b and a vibration absorbing rubber member 29c sandwiched between the members 29a and 29b.

Figure 8:
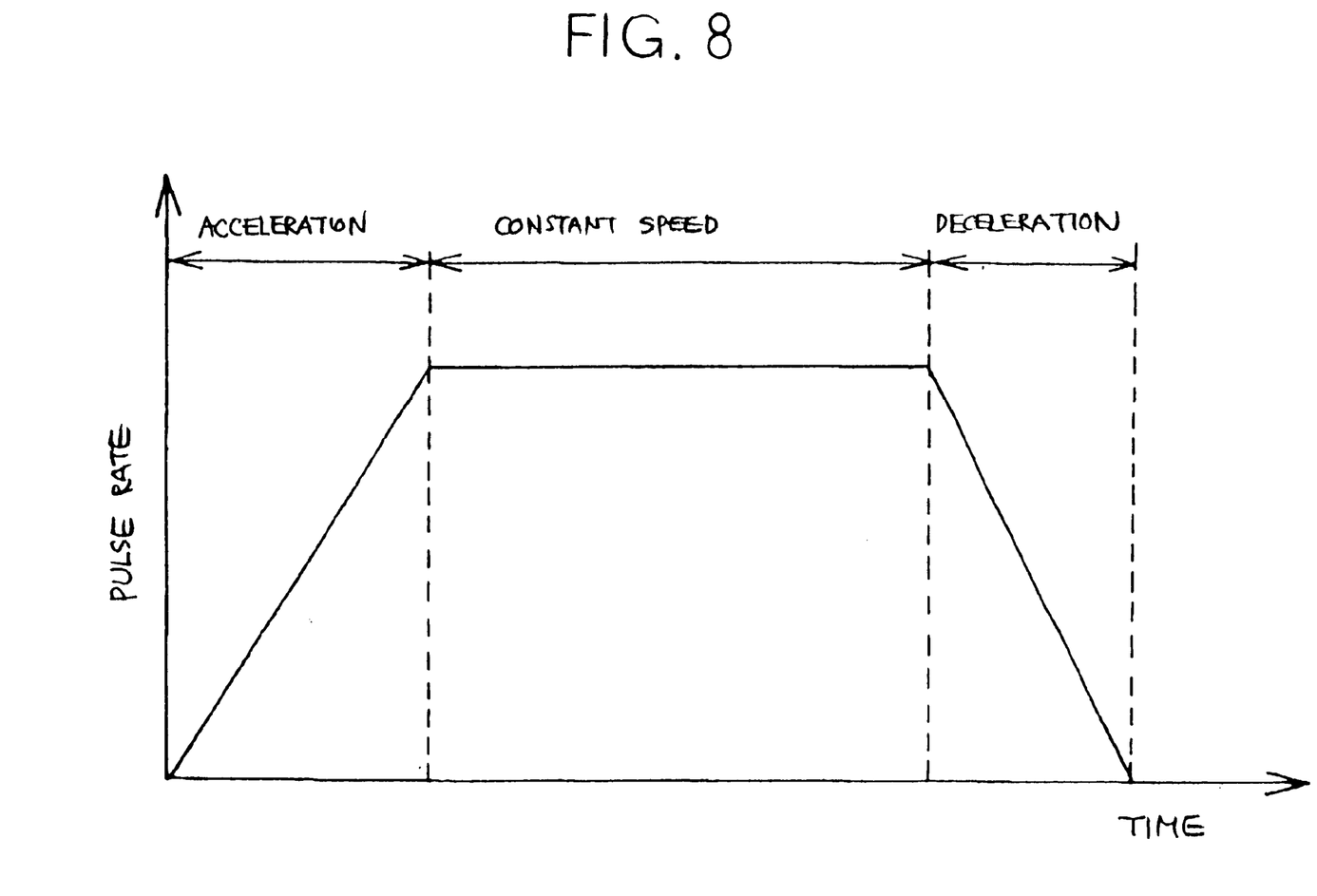
FIG. 8 is a graph showing a specific operation pattern of the revolver motor.

The revolver motor 295 for driving the revolver 230 may be implemented by a stepping motor. FIG. 8 shows a specific relation between the pulse rate and the time, i.e., a specific pulse table representative of the operation pattern of the revolver motor 295. Every time the revolver 230 should be rotated by 90 degrees for switching the color for development, the revolver motor 295 accelerates the revolver 230, then drives it as a constant speed, and then decelerates it in accordance with the above pulse table.

During deceleration period shown in FIG. 8, the rotation speed of the motor gear 296 sequentially decreases, but the revolver gear 294 tends to continuously rotate at a constant speed due to inertia. As a result, as shown in FIG. 6, a force F acts on the motor gear 296. The force F is the sum of a tangential force and a normal force due to the involute teeth of the revolver gear 294 and motor gear 296.

During repeated image formation, the temperature of the motor mount 29 rises and causes the Young's modulus of the rubber member 29c to decrease. Consequently, in the deceleration period, the force F causes the shaft of the revolver motor 295 to move away from the revolver gear 294 more than in the other periods. This causes the revolver motor 295 to shake and often causes the teeth of the motor gear 296 and those of the revolver gear 294 to skip each other. In light of this, the illustrative embodiment additionally includes a member for regulating the position of the revolver motor 295 by bearing the above force F.

Figure 9A:
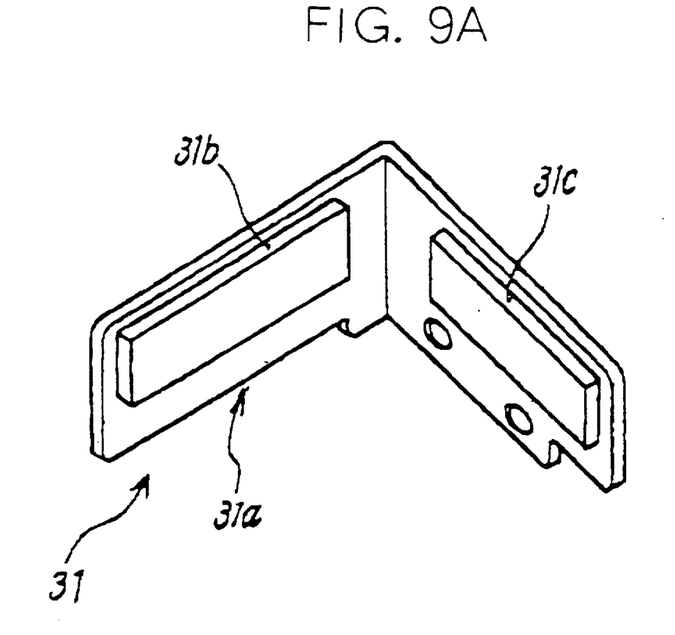
FIG. 9A is an isometric view of a bracket or motor position regulating member also included in the illustrative embodiment.
Figure 9B:
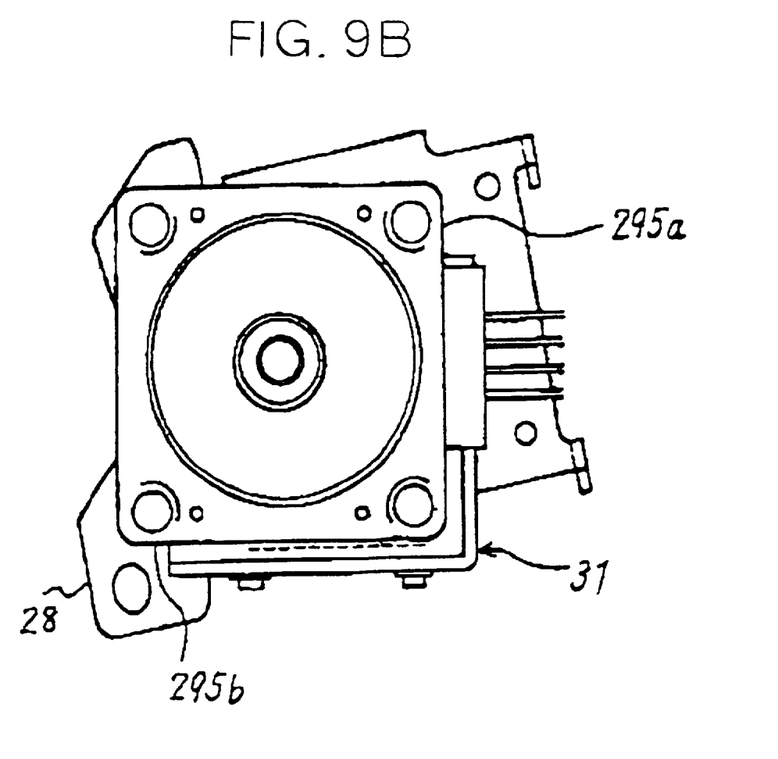
FIG. 9B is a view as seen from the rear end side of a motor shaft, showing the bracket of FIG. 9A mounted on a motor bracket.

FIG. 9A shows a bracket 31 that is a specific form of the above motor position regulating member. FIG. 9B shows the bracket 31 mounted on the motor bracket 28. As shown, the bracket 31 is a generally L-shaped metallic member 32a to which a pair of rubber pieces 31b and 31c are adhered for absorbing vibration. The bracket 31 is fastened to the motor bracket 28 by screws such that the rubber pieces 31b and 31c abut against a motor case substantially in parallel to the shaft of the revolver motor 295.

As shown in FIGS. 5 and 6, the rubber pieces 31b and 31c respectively abut against two surfaces 295a and 295b of the motor case adjoining the mounting surface of the revolver motor 295 and counteracting the force F to act on the motor gear 296. During deceleration, the force F acts on the revolver motor 296 in the shearing direction between the surface of the motor mount 29 mounted on the copier body and the revolver motor 295. However, the bracket 31 bears the force F and maintains the position of the revolver motor 295 stable. This successfully obviates the skip of the gear teeth ascribable to the shaking of the revolver motor 295. It follows that the omission a color ascribable to the deviation of a developing position is obviated which would otherwise occur due to the overrun of the revolver 230.

It is to be noted that while the bracket 31 is particularly effective at the time of deceleration of the revolver motor 295, it also regulates the position of the motor 295 even at the time of acceleration.

Further, the bracket 31 bears and scatters the force F customarily born only by the motor mount 29. This successfully reduces a load to act on the motor mount 29 and thereby slows down the deterioration (particularly elasticity) of the motor mount 29 ascribable to fatigue and temperature.

Moreover, the rubber pieces 31b and 31c included in the bracket 31 intercept vibration otherwise imparted from the revolver motor 295 to the copier body. The rubber pieces 31b and 31c therefore insure desirable image quality and frees the operator from annoying noise.

In the above embodiment, the bracket 31 bears the force F acting on the motor gear 296 with two rubber pieces 31b and 31c abutting against two surfaces 295a and 295b of the revolver motor 295. Alternatively, the bracket 31 may bear the force F with one of the rubber pieces 31b and 31c. Further, while the rubber pieces 31b and 31c have been shown and described as constantly contacting the motor case of the revolver motor 295, they may be slightly spaced from the motor case and regulate the position of the motor 295 only when the motor 295 shakes.

The illustrative embodiment has concentrated on a rotary unit implemented as a revolver. The present invention is similarly applicable to any other rotary unit which is driven and stopped by a motor and apt to overrun at the time of a stop due to a certain degree of inertia. The gears used to transmit the rotation of the revolver motor 295 may, of course, be replaced with any other suitable drive transmission members, e.g., a chain and sprockets.

In summary, it will be seen that the present invention provides an image forming apparatus having various unprecedented advantages, as enumerated below.

(1) An elastic member prevents the vibration of a motor member from being transferred from the surface of a motor case substantially perpendicular to the shaft of the motor member to an apparatus body, reducing the vibration and noise of the apparatus body. When the motor member is driven, a motor position regulating member regulates the position of the motor member and thereby prevents the motor member from shaking due to a reaction imparted from a gear or similar drive transmission member at the driven side to a gear or similar drive transmission member mounted on the shaft of the motor member. The drive transmission members cooperate to cause a developing unit to rotate. The motor position regulating member therefore prevents the engaging condition between the drive transmission members from varying, e.g., prevents the teeth of the above gears from skipping each other. This not only reduces the above vibration and noise, but also insures the accurate stop of the rotary unit at a preselected position.

(2) The rotation of the motor member can be surely transferred to the rotary unit by a simple configuration in which a motor gear mounted on the motor and a gear mounted on the apparatus body or the rotary unit mesh with each other. Again, the accurate stop of the rotary unit is insured.

(3) A force to act on a vibration absorbing member supporting the motor member is scattered and absorbed by the motor position regulating member including the elastic member. This reduces the deterioration of the vibration absorbing member ascribable to fatigue and temperature.

(4) When the rotary unit is implemented as a developing device, a plurality of developing sections arranged in the developing device can be sequentially brought to a developing position for forming a full-color image. The developing device also achieves the above advantage (1).

(5) When the motor position regulating member adjoins the mounting surface of the motor case, it can bear a force acting in the shearing direction between the surface of the vibration absorbing member mounted on the apparatus body and the mounting surface of the motor member. This also achieves the advantage (3) and insures desirable image quality.

Various modifications will become possible for those skilled in the art after receiving the teachings of the present disclosure without departing from the scope thereof.

What is claimed is:

1. An image forming apparatus comprising:

an apparatus body;

a rotary unit rotatable relative to said apparatus body; and drive means for causing said rotary unit to rotate and then stop at a preselected position;

said drive means comprising a motor member, vibration absorbing means intervening between a mounting surface of a motor case substantially perpendicular to a shaft of said motor member and said apparatus body, and motor position regulating means contacting or adjoining a surface of said motor case substantially parallel to said shaft of said motor member, wherein said motor position regulating means includes an elastic member.

2. An apparatus as claimed in claim 1, wherein said motor member includes an output shaft on which a motor gear is mounted, said apparatus body or said rotary unit including a gear meshing with said motor gear.

3. An apparatus as claimed in claim 2, wherein said rotary unit comprises a developing device including a plurality of developing sections each storing a developer of particular color.

4. An apparatus as claimed in claim 1, wherein said rotary unit comprises a developing device including a plurality of developing sections each storing a developer of particular color.

5. An image forming apparatus comprising:

an apparatus body;

a rotary unit rotatable relative to said apparatus body; and a drive unit configured to cause said rotary unit to rotate and then stop at a preselected position;

said drive unit comprising a motor member, a vibration absorbing member intervening between a mounting surface of a motor case substantially perpendicular to a shaft of said motor member and said apparatus body, and a motor position regulating member contacting or adjoining a surface of said motor case substantially parallel to said shaft of said motor member, wherein said motor position regulating member includes an elastic member.

6. An apparatus as claimed in claim 5, wherein said motor member includes an output shaft on which a motor gear is mounted, said apparatus body or said rotary unit including a gear meshing with said motor gear.

7. An apparatus as claimed in claim 6, wherein said rotary unit comprises a developing device including a plurality of developing sections each storing a developer of particular color.

8. An apparatus as claimed in claim 5, wherein said rotary unit comprises a developing device including a plurality of developing sections each storing a developer of particular color.

* * * * *